Nov. 25, 1941.  J. J. DANIEL  2,263,617
GATE VALVE
Filed Sept. 25, 1939  2 Sheets-Sheet 1

Inventor
J. J. DANIEL
Jesse R Stone
Victor B Clark
Attorneys

Nov. 25, 1941.    J. J. DANIEL    2,263,617
GATE VALVE
Filed Sept. 25, 1939    2 Sheets-Sheet 2

Inventor
J. J. DANIEL
Jesse R Stone
Lester B Clark

Attorneys

Patented Nov. 25, 1941

2,263,617

UNITED STATES PATENT OFFICE 2,263,617

GATE VALVE

Joseph J. Daniel, Houston, Tex.

Application September 25, 1939, Serial No. 296,345

1 Claim. (Cl. 251—18)

The invention relates to a valve of the type which has a swingable gate member arranged to be clamped in closed position so as to maintain a seal.

It is one of the objects of the invention to provide a valve having a closure member which swings on an arc but which can be clamped in and released while closed or open so that the member is free to be swung to either position.

Another object of the invention is to provide a single operating device for moving a valve member and locking it in closed position or in open position.

Another object of the invention is to provide an operating device which first moves the valve member to closed position and thereafter operates a locking device to clamp the valve member in such closed position.

Other and further objects of the invention will be readily apparent when the following description is considered in connection with the accompanying drawings wherein.

Figures 1, 2:
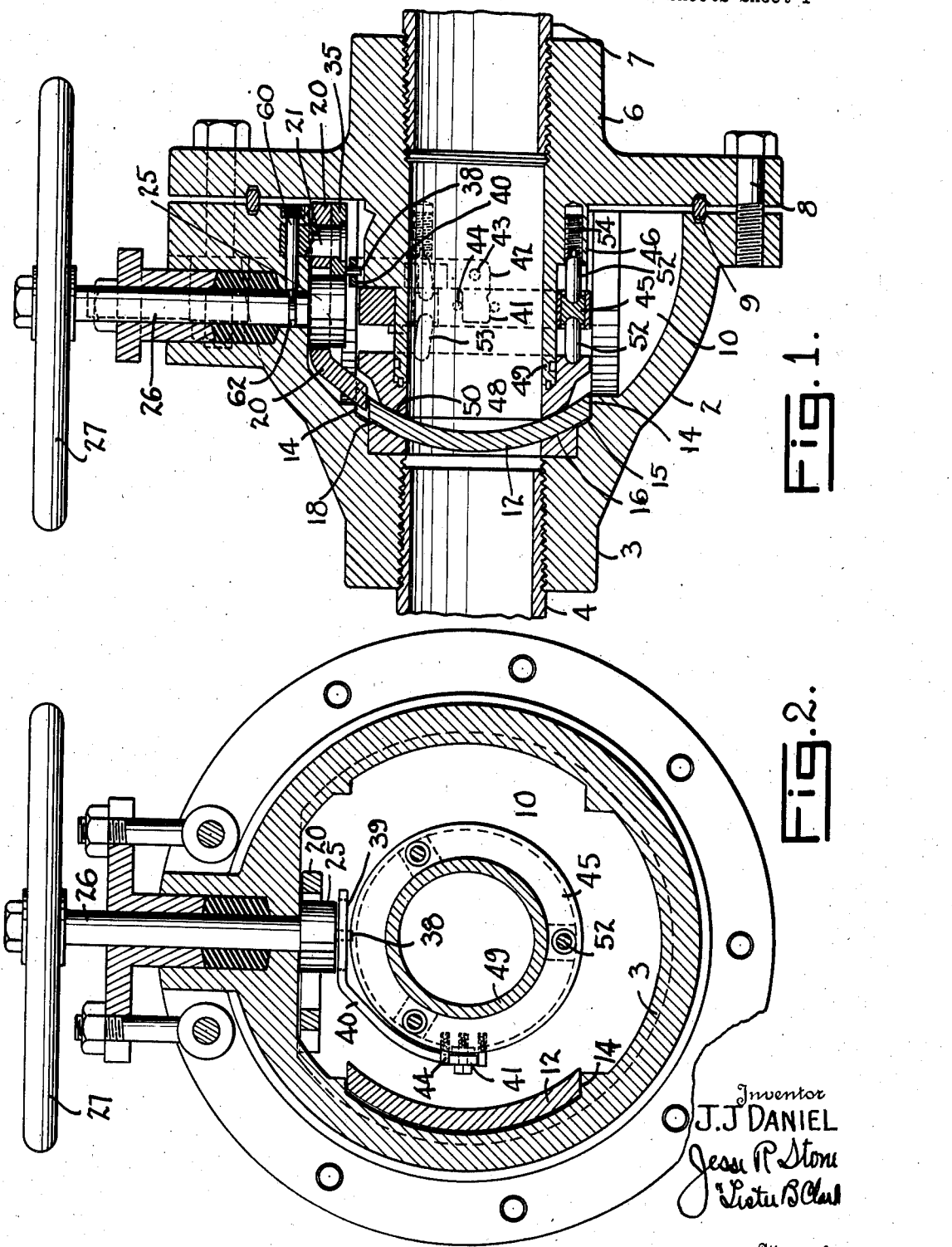
Fig. 1 is a vertical sectional view showing the valve in closed but not locked position.
Fig. 2 is a transverse section taken through the locking mechanism as seen in Fig. 1.

In Fig. 1 the valve housing is indicated generally at 2 and has the base portion 3 connected to a pipe 4 whereas the cap portion 6 is connected to a pipe 7. The parts 3 and 6 are held together by bolts 8 and a seal ring 9 is clamped between them.

Figures 3, 4:
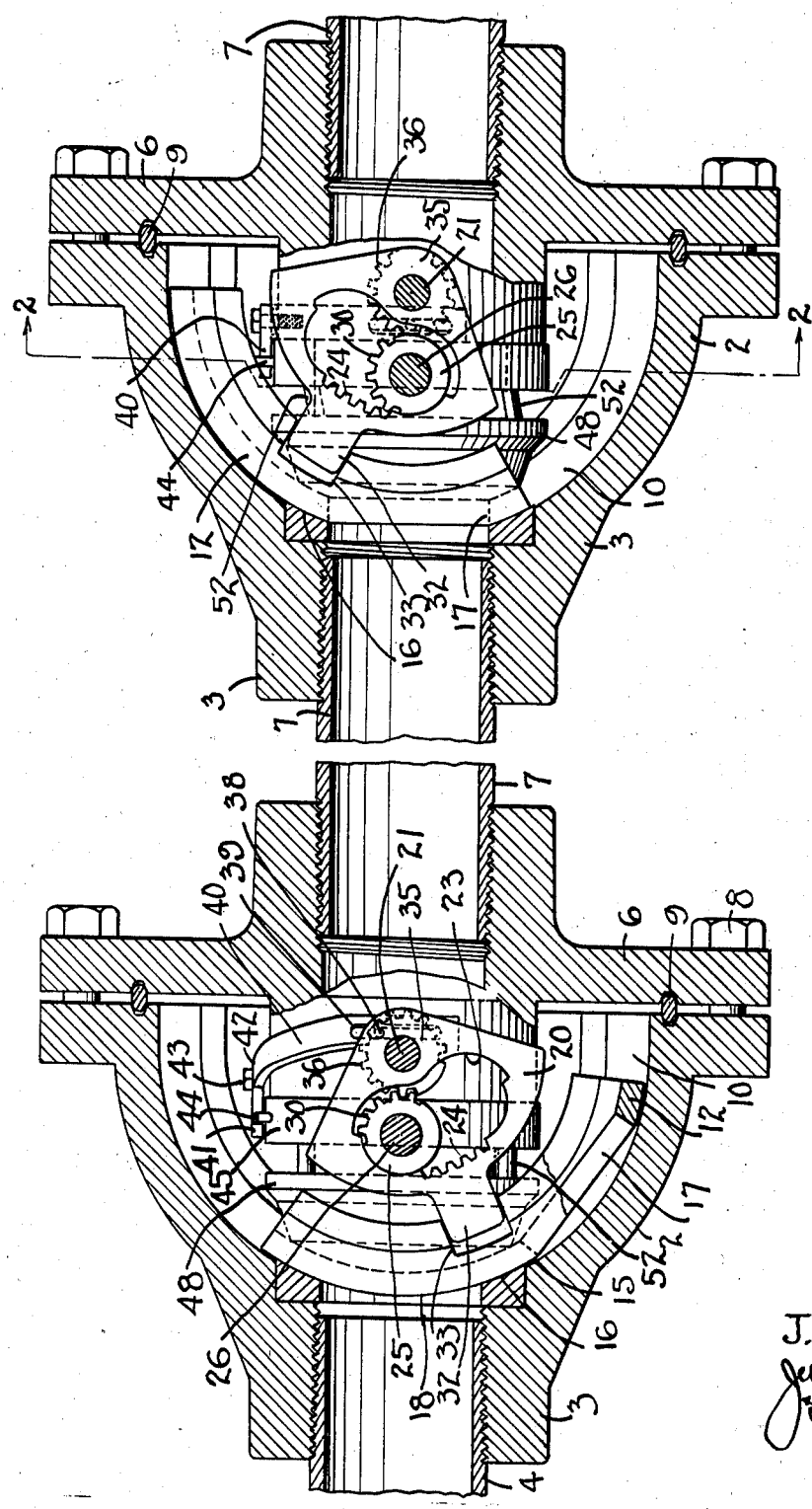
Fig. 3 illustrates the device with the valve member in open position but not yet locked.
Fig. 4 shows the valve member in closed and locked position and illustrates the arrangement of the locking mechanism.

The base 3 is of a peculiar construction in that it has a chamber 10 therein which is arranged to hold the valve member and its locking mechanism. The valve member 12, as best seen in Fig. 4, is an arcuate member formed as a portion of a sphere. This member is slidable in the chamber 10 between the side guideways 14 and has an outer curved face 15 which is arranged to seat upon the seat ring 16. This gate member has a passage 17 therethrough which is arranged to move into alignment with the passage through the pipes 4 and 7, as best seen in Fig. 3. This member is also arranged for swinging movement so that the imperforate portion 18 thereof moves over the opening to form a closure.

This valve member 12 is arranged to be turned by the arm 20. This arm 20 is best seen in Fig. 1 in section and is mounted upon the pivot pin 21 for turning movement. The arm has an opening 23 therein which has a series of teeth 24 formed on the outer side of the opening and is arranged to receive the segment 25 for turning movement in the opening 23. This segment 25 is mounted upon the operating stem 26 to be turned by the hand wheel 27. When the teeth 30 on the segment 25 engage with the teeth 24 the arm 20 will be caused to turn about the spindle 21 as a center. A lug 32 on the arm 20 is arranged to engage in an opening 33 in the gate member 12, as best seen in Fig. 4, so that the gate member is compelled to turn with the arm 20.

Particular attention is directed to the fact that the segment 25 has the teeth 30 on only a portion thereof and the teeth are so arranged that after the last tooth has left the arm the arm will remain in that position while the segment 25 continues to turn. Thus as the segment 25 turns in a clockwise direction it will move the gate member to the maximum open position, as shown in Fig. 3, whereas when it is turned in a counterclockwise direction, as shown in Fig. 4, it will move the gate valve to the closed position.

When the gate member is moved to the closed position of Fig. 4 and the segment 25 continues to rotate it is arranged to engage a pinion 35 which is mounted for turning movement on the spindle 21. This pinion 35 has a set of teeth 36 thereon which are arranged to engage the teeth 30 on the segment. In this manner the continued rotation of the segment 25 after it leaves the teeth 24 causes the teeth 30 to engage the teeth 36 and in this manner the pinion 35 is turned. The pinion 35 carries a pin 38 which is eccentrically mounted thereon and this pin is arranged to engage in a slot 39 in the lever 40, as best seen in Fig. 2. This lever 40 is of a bell crank configuration having the finger 41 thereon, as seen in Fig. 1. The heel 42 of the lever is mounted on a pivot pin 43, as best seen in Fig. 4, so that when the lever is oscillated by the turning of the pinion 35 the finger 41 is caused to oscillate in a similar manner.

A ring 45 is turnably mounted upon the shank 46 carried by the cap 6, the pin 43 being fixed to this shank. The ring 45 carries the pins 44 so that the ring 45 is moved upon rocking of the finger 41.

Fig. 4 shows the locking device in the form of a shoe 48, which is mounted upon a skirt 49 on the shank 46. This shoe has a surface 50 which is arranged to engage the inner face of the gate member 12, as seen in Fig. 1. To negotiate the locking of the gate member this shoe 48 is moved to the left as seen in Fig. 1 to abut against the gate member. This movement or shifting of the shoe is accomplished by the pins 52, which are disposed in suitable recesses in the shoe 48 and in the ring 45. These pins are normally arranged at an angle, as seen at 53 in Fig. 1, so that relative turning movement between the ring 45 and the shank 46 will cause these pins to be moved to a position perpendicular to the ring 45. The adjustment screws 54 of Fig. 1 allow the locking device to be set for the proper clearance of the parts and to insure a proper pressure in clamping as well as to close the chamber 10.

This movement, of course, moves the ring 45 away from the shank 46 and causes a shifting movement of the shoe 48 to force it against the gate member 12. Opposite tilting movement of the lever 40 causes the pins 53 to move to an inclined position, removing the force applied to the shoe 48 and releasing the gate member 12. Thus when the handle 27 is turned the first movement, if the gate is in closed position, is to turn the pinion 35 to unlock the shoe 48 and then as the turning of the teeth 30 continues they will be released from the pinion 35 and engage the teeth 24 of the arm 20, whereupon the arm 20 will move and carry with it the gate member until the open position of Fig. 3 is reached. Continued rotation moves the segment 25 out of the teeth 24 and into the pinion 35 to actuate the locking of the gate in open position exactly the reverse of the movement described in locking the gate in closed position.

When it is desired to close the valve the handle 27 is turned so as to rotate the arm 20 and after the teeth 30 have passed out of the teeth 24 they next engage the pinion 35 so as to swing the arm 40, turn the ring 45, and lock the shoe 48 permanently in position.

In order to make the assembly readily adaptable to use a locking member 60 has been inserted into the housing 2 to serve the dual purpose of holding the spindle 21 in place and prevent axial movement of the stem 26 by being engaged in a groove 62 in the stem.

Broadly the invention contemplates a construction wherein the gate member can be readily moved to open or closed position and securely locked in closed or open position.

What is claimed is:

A valve comprising a housing, inlet and outlet openings therein, a tubular member extending within said housing from one of said openings, a seat about the other opening, a gate pivoted on an axis transverse to said tubular member, and movable to a closed position between said tubular member and said seat, a sealing member slidable on said tubular member, an operating member rotatably mounted in the housing and connected to said sealing member, an operating shaft in said housing, having a gear thereon engaging said gate and said operating member, and so formed that upon rotation of said shaft said gate is first moved to closed position and said sealing member is advanced on the tubular member to force said gate against the seat.

JOSEPH J. DANIEL.